US009461539B2

(12) United States Patent
Chern et al.

(10) Patent No.: US 9,461,539 B2
(45) Date of Patent: Oct. 4, 2016

(54) SELF-CALIBRATED VOLTAGE REGULATOR

(71) Applicant: TAIWAN SEMICONDUCTOR MANUFACTURING COMPANY, LTD., Hsinchu (TW)

(72) Inventors: Chan-Hong Chern, Palo Alto, CA (US); Tao Wen Chung, San Jose, CA (US); Ming-Chieh Huang, San Jose, CA (US); Chih-Chang Lin, San Jose, CA (US); Tsung-Ching (Jim) Huang, San Jose, CA (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 484 days.

(21) Appl. No.: 13/839,295

(22) Filed: Mar. 15, 2013

(65) Prior Publication Data

US 2014/0266118 A1   Sep. 18, 2014

(51) Int. Cl.
*H02M 3/156* (2006.01)
*H02M 1/00* (2006.01)

(52) U.S. Cl.
CPC ..... *H02M 3/156* (2013.01); *H02M 2001/0025* (2013.01)

(58) Field of Classification Search
CPC ..... H02M 3/156; H02M 3/157; G05F 1/452; G05F 1/573
USPC .......... 323/224, 272, 277, 280–285
See application file for complete search history.

(56) References Cited

U.S. PATENT DOCUMENTS

| 3,715,675 | A | * | 2/1973 | Chibana ................... 330/283 |
| 5,764,460 | A | | 6/1998 | Perillo et al. |
| 5,864,227 | A | | 1/1999 | Borden et al. |
| 5,903,504 | A | * | 5/1999 | Chevallier et al. ........ 365/207 |
| 6,201,375 | B1 | * | 3/2001 | Larson et al. ............. 323/277 |
| 6,567,279 | B2 | * | 5/2003 | Brkovic ............... H02M 3/28 323/282 |
| 7,071,664 | B1 | | 7/2006 | Teggatz et al. |
| 7,199,567 | B2 | | 4/2007 | Eberlein |

(Continued)

FOREIGN PATENT DOCUMENTS

CN   101322088   12/2008

OTHER PUBLICATIONS

Office Action dated Jun. 14, 2016 from corresponding No. CN 201310583338.X.

(Continued)

*Primary Examiner* — Yemane Mehari
(74) *Attorney, Agent, or Firm* — Hauptman Ham, LLP

(57) ABSTRACT

A voltage regulator includes a driving circuit, a feedback circuit, first and second control circuits and a resistor. The driving circuit is coupled to an input node and an output node and generates an output voltage at the output node from an input voltage at the input node. The feedback circuit is coupled to the output node and generates a feedback voltage based on the output voltage. The first control circuit is coupled to the feedback circuit and the driving circuit to control the output voltage based on the feedback voltage. The resistor has opposite first and second terminals. The first terminal of the resistor is coupled to the output node. The second control circuit is coupled to the second terminal of the output stage resistor and the feedback circuit to control the feedback voltage based on a regulated voltage at the second terminal of the resistor.

20 Claims, 10 Drawing Sheets

(56) References Cited

U.S. PATENT DOCUMENTS

| | | |
|---|---|---|
| 7,477,043 B2 | 1/2009 | Eberlein |
| 7,477,044 B2 | 1/2009 | Eberlein |
| 7,538,526 B2 | 5/2009 | Kojima et al. |
| 7,973,518 B2 * | 7/2011 | Shor et al. ............... 323/224 |
| 7,973,521 B2 | 7/2011 | Chen et al. |
| 8,080,984 B1 | 12/2011 | Geynet |
| 8,115,463 B2 | 2/2012 | Wang |
| 8,120,338 B2 | 2/2012 | Kawagishi et al. |
| 8,154,263 B1 | 4/2012 | Shi et al. |
| 8,169,204 B2 | 5/2012 | Jian |
| 8,183,843 B2 | 5/2012 | Einerman et al. |
| 8,188,725 B2 | 5/2012 | Draghi et al. |
| 8,378,654 B2 | 2/2013 | Chern et al. |
| 2008/0136396 A1 | 6/2008 | Heilmann |

OTHER PUBLICATIONS

Office Action dated Sep. 21, 2015 from corresponding No. TW 103102060.

* cited by examiner

US 9,461,539 B2

SELF-CALIBRATED VOLTAGE REGULATOR

RELATED APPLICATION(S)

The instant application is related to a U.S. patent application Ser. No. 12/750,260, filed Mar. 30, 2010, the entire content of which is incorporated by reference herein.

BACKGROUND

A voltage regulator is configured to automatically maintain a constant voltage level at a load. A characteristic of a voltage regulator is a power supply rejection ratio (PSRR), which is used to describe the amount of noise from a power supply that can be rejected by the voltage regulator. PSRR is defined as the ratio of the change (or noise) in the power supply voltage ($\Delta VDD$) to the change (or noise) in the output voltage ($\Delta VOUT$) caused by the change in the power supply voltage node VDD, i.e., $PSRR=\Delta VDD/\Delta VOUT$.

A higher PSRR value indicates a higher level of power supply noise immunity, which is a consideration in many modern electronic devices.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1A:
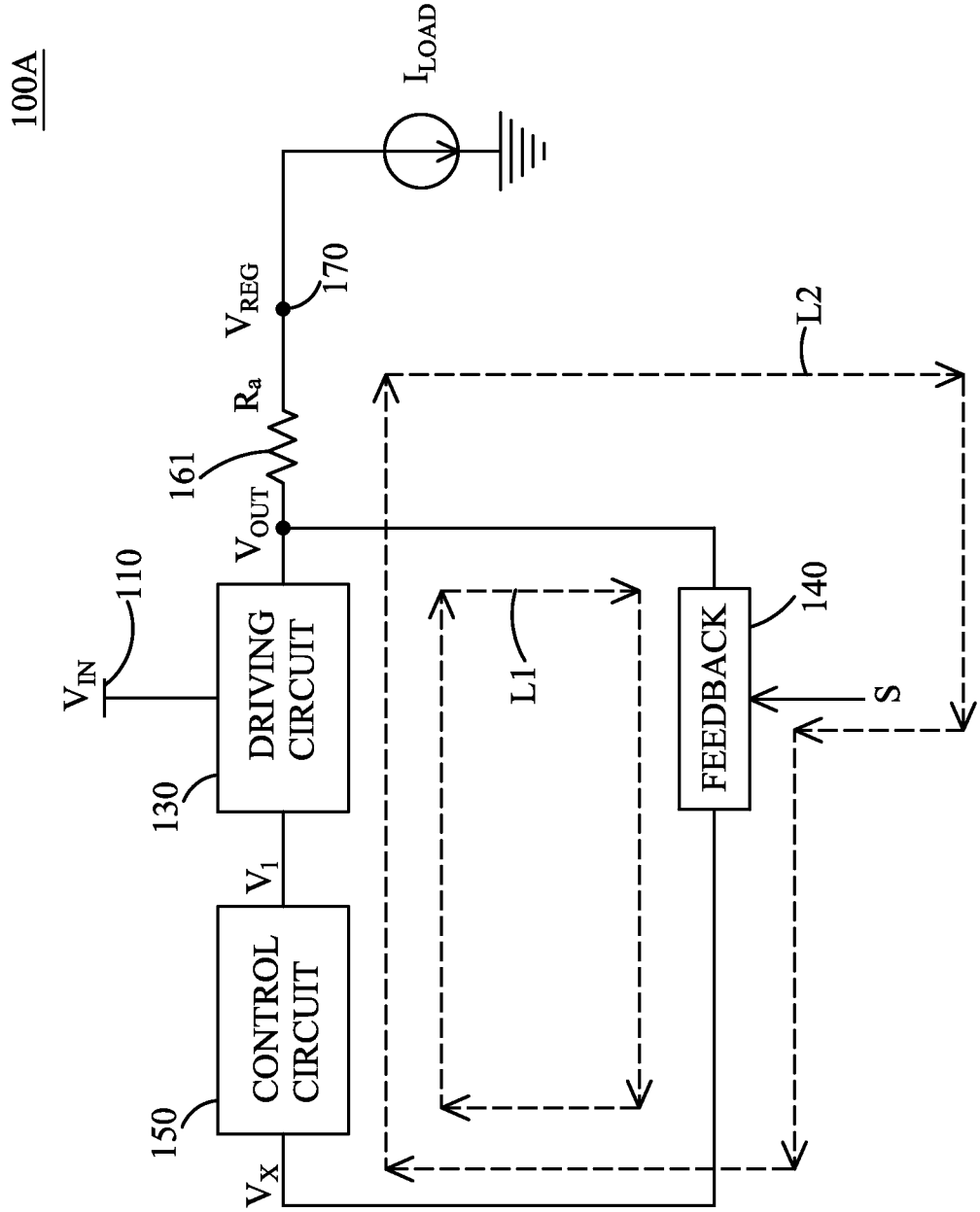
FIG. 1A is a block diagram of a voltage regulator in accordance with some embodiments.

It is to be understood that the following disclosure provides many different embodiments or examples, for implementing different features of various embodiments. Specific examples of components and arrangements are described below to simplify the present disclosure. The inventive concept may; however, be embodied in many different forms and should not be construed as being limited to the embodiments set forth herein. It will be apparent; however, that one or more embodiments may be practiced without these specific details. Like reference numerals in the drawings denote like elements.

In some embodiments, a resistor is arranged between an output node of a voltage regulator and a load. An output voltage at the output node is controlled by a feedback circuit. The feedback circuit is adjusted based on a regulated voltage at the load to maintain the regulated voltage constant despite variations in a load current. In at least one embodiment, a high PSRR of -40 dB or better is achievable across all frequencies.

FIG. 1A is a schematic circuit diagram of a voltage regulator 100A in accordance with some embodiments. The voltage regulator 100A comprises an input node 110, an output node 120, a driving circuit 130, a feedback circuit 140, a control circuit 150 (also referred to herein as "first control circuit"), and an output stage resistor 161 (also referred to herein as "resistor Ra"). The voltage regulator 100A is arranged to receive an input voltage $V_{IN}$ at the input node 110 and provide a regulated voltage $V_{REG}$ to a load via a regulated voltage terminal 170.

The driving circuit 130 is coupled to the input node 110 and the output node 120, and is configured to generate an output voltage $V_{OUT}$ at the output node 120 from the input voltage $V_{IN}$ at the input node 110. The feedback circuit 140 is coupled to the output node 120 and is configured to generate a feedback voltage $V_X$ based on the output voltage $V_{OUT}$. The feedback circuit 140 has a variable parameter which is controllable, by a control signal S, in order to vary the feedback voltage $V_X$ independently of the output voltage $V_{OUT}$. The first control circuit 150 is coupled to the feedback circuit 140 and the driving circuit 130, and is configured to control the output voltage $V_{OUT}$ based on the feedback voltage $V_X$.

The driving circuit 130, the feedback circuit 140 and the first control circuit 150 together define a feedback loop L1 for maintaining the output voltage $V_{OUT}$ at a predetermined level. For example, in one or more embodiments, if the output voltage $V_{OUT}$ decreases, the feedback circuit 140 decreases the feedback voltage $V_X$ in response to the decreased output voltage $V_{OUT}$. In response to the decreased feedback voltage $V_X$, the first control circuit 150 outputs an appropriate voltage $V_1$ to cause the driving circuit 130 to increase the output voltage $V_{OUT}$. If the output voltage $V_{OUT}$ increases, the feedback circuit 140 increases the feedback voltage $V_X$ in response to the increased output voltage $V_{OUT}$. In response to the increased feedback voltage $V_X$, the first control circuit 150 outputs an appropriate voltage $V_1$ to cause the driving circuit 130 to decrease the output voltage $V_{OUT}$.

The resistor $R_a$ has opposite first and second terminals, with the first terminal coupled to the output node 120 and the second terminal coupled to the regulated voltage terminal 170. The regulated voltage $V_{REG}$ on the regulated voltage terminal 170 is supplied to the load and causes a load current $I_{LOAD}$ to flow through the resistor $R_a$. As a result, there is a voltage difference between the output voltage $V_{OUT}$ and the regulated voltage $V_{REG}$, i.e., $V_{OUT}-V_{REG}=I_{LOAD}\times R_a$. When the load current $I_{LOAD}$ varies, the voltage drop across the resistor $R_a$ also varies which, in turn, potentially causes a variation in the regulated voltage $V_{REG}$ applied to the load. In order to maintain the regulated voltage $V_{REG}$ constant in response to variations in the load current $I_{LOAD}$, a control loop, or calibration loop, L2 is provided in accordance with some embodiments.

The calibration loop L2 includes at least the feedback circuit 140, the first control circuit 150, the driving circuit 130, and the resistor $R_a$. In the calibration loop L2, the control signal S applied to the feedback circuit 140 is controlled, either automatically or manually, based on the regulated voltage $V_{REG}$. In one or more embodiments, the control signal S is controlled automatically by a second control circuit described in detail hereinafter, and the calibration loop L2 includes such second control circuit. In one or more embodiments, the control signal S is controlled manually, e.g., by an operator monitoring the regulated voltage $V_{REG}$, and the calibration loop L2 includes a manual control of the control signal S.

In some embodiments, the control signal S adjusts the feedback voltage $V_X$ in accordance with the regulated voltage $V_{REG}$ to maintain the regulated voltage $V_{REG}$ at a desired level. For example, if the regulated voltage $V_{REG}$ decreases (due to an increase in the load current $I_{LOAD}$), the control signal S is controlled, based on the decreased regulated voltage $V_{REG}$, to cause the feedback circuit 140 to decrease the feedback voltage $V_X$. The decreased feedback voltage $V_X$ causes the first control circuit 150 to increase the output voltage $V_{OUT}$ which, in turn, increases the regulated voltage $V_{REG}$. If the regulated voltage $V_{REG}$ increases, the control signal S is controlled, based on the increased regulated voltage $V_{REG}$, to case the feedback circuit 140 to increase the feedback voltage $V_X$. The increased feedback voltage $V_X$ causes the first control circuit 150 to decrease the output voltage $V_{OUT}$ which, in turn, decreases the regulated voltage $V_{REG}$. As a result, the regulated voltage $V_{REG}$ to be supplied to the load is maintained at a predetermined level.

Figure 1B:
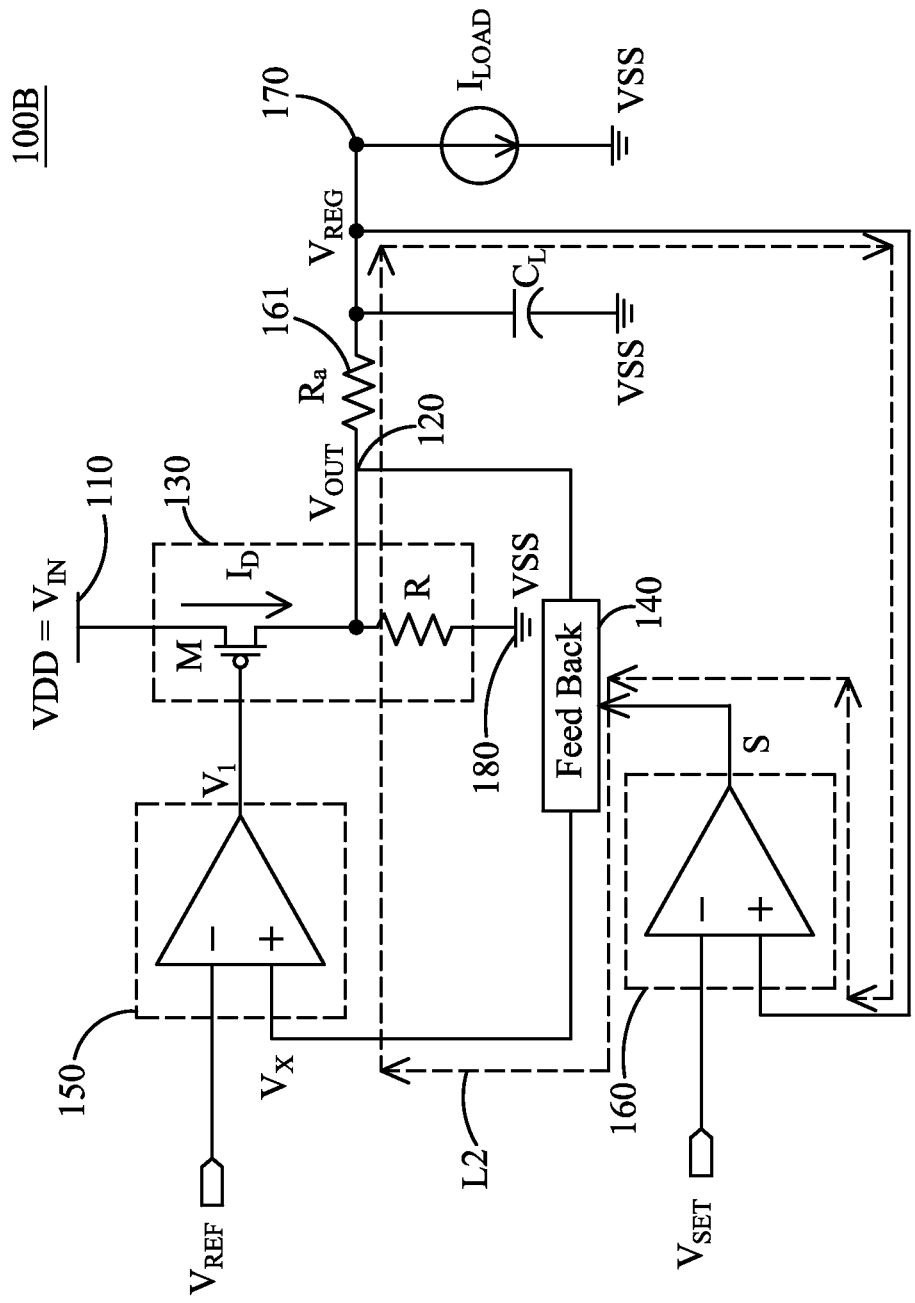
FIGS. 1B and 2 are schematic circuit diagrams of various voltage regulators in accordance with some embodiments.

FIG. 1B is a schematic circuit diagram of a voltage regulator 100B in accordance with some embodiments. The voltage regulator 100B is a circuit implementation of the voltage regulator 100A, and comprises an input node 110, an output node 120, a driving circuit 130, a feedback circuit 140, a first control circuit 150, a second control circuit 160, and an output stage resistor 161. The voltage regulator 100B is arranged to receive a power supply voltage VDD at the input node 110 and provide the received power supply voltage VDD in the form of a regulated voltage $V_{REG}$ to a load via a regulated voltage terminal 170.

The driving circuit 130 is coupled to the input node 110 and the output node 120, and is configured to generate an output voltage $V_{OUT}$ at the output node 120 from an input voltage $V_{IN}$ at the input node 110. The driving circuit 130 is controllable to regulate or adjust the output voltage $V_{OUT}$. In some embodiments, the driving circuit 130 includes a resistor R and a transistor M coupled in series between the input node 110 and another voltage supply terminal 180. In some embodiments, the transistor M is a p-channel metal-oxide semiconductor (PMOS) transistor, the input voltage $V_{IN}$ is the power supply voltage VDD to be regulated, and the voltage supply terminal 180 is a ground voltage terminal having a ground voltage VSS, as illustrated in FIG. 1. In some embodiments, the transistor M is an n-channel metal-oxide semiconductor (NMOS) transistor, the power supply voltage VDD to be regulated is supplied to the voltage supply terminal 180 which becomes an input node, and the ground voltage VSS is supplied to the node 110. A current $I_D$ flowing through the transistor M is adjustable by an appropriate voltage $V_1$ applied to the gate of the transistor M. Because $V_{OUT}=I_D \times R$, the output voltage $V_{OUT}$ is regulated in accordance with an adjustment in the current $I_D$ by varying the voltage $V_1$. Other configurations and/or operations of the driving circuit are within the scope of various embodiments.

The feedback circuit 140 is coupled to the output node 120 and is configured to generate a feedback voltage $V_X$ based on the output voltage $V_{OUT}$. The feedback circuit 140 has a variable parameter which is controllable in order to vary the feedback voltage $V_X$ independently of the output voltage $V_{OUT}$. For example, at the same voltage level of the output voltage $V_{OUT}$, the feedback voltage $V_X$ has different voltage levels at different values of the variable parameter of the feedback circuit 140. In some embodiments, the feedback circuit 140 includes a voltage divider having a variable voltage ratio, as described with respect to FIGS. 2, 4, 6 and 7. Other configurations of the feedback circuit are within the scope of various embodiments.

The first control circuit 150 is coupled to the feedback circuit 140 and the driving circuit 130, and is configured to control the output voltage $V_{OUT}$ based on the feedback voltage $V_X$. In some embodiments, the first control circuit 150 compares the feedback voltage $V_X$ with a reference voltage $V_{REF}$ (e.g., supplied from a band-gap reference circuit) and outputs the voltage $V_1$ based on the comparison. The voltage $V_1$ is supplied to the driving circuit 130, e.g., via the gate of the transistor M, to control the output voltage $V_{OUT}$. In some embodiments, when the feedback voltage $V_X$ is lower than the reference voltage $V_{REF}$ (which indicates that the output voltage $V_{OUT}$ is lower than a predetermined voltage level), the first control circuit 150 outputs an appropriate voltage $V_1$ to increase the current $I_D$ of the transistor M, thereby increasing the output voltage $V_{OUT}$. When the feedback voltage $V_X$ is higher than the reference voltage $V_{REF}$ (which indicates that the output voltage $V_{OUT}$ is higher than the predetermined voltage level), the first control circuit 150 outputs an appropriate voltage $V_1$ to decrease the current $I_D$ of the transistor M, thereby decreasing the output voltage $V_{OUT}$. Other configurations and/or operations of the first control circuit are within the scope of various embodiments.

The resistor $R_a$ has opposite first and second terminals, with the first terminal coupled to the output node 120 and the second terminal coupled to the regulated voltage terminal 170. The regulated voltage terminal 170 is coupled to a de-coupling capacitor $C_L$ to filter out noise. The regulated voltage $V_{REG}$ on the regulated voltage terminal 170 is supplied to the load and causes a load current $I_{LOAD}$ to flow through the resistor $R_a$. As a result, there is a voltage difference between the output voltage $V_{OUT}$ and the regulated voltage $V_{REG}$, i.e., $V_{OUT}-V_{REG}=I_{LOAD} \times R_a$. When the load current $I_{LOAD}$ varies, the voltage drop across the resistor $R_a$ also varies which, in turn, potentially causes a variation in the regulated voltage $V_{REG}$ applied to the load. In order to maintain the regulated voltage $V_{REG}$ constant in response to variations in the load current $I_{LOAD}$, the second control circuit 160 is provided. The second control circuit 160, the feedback circuit 140, the first control circuit 150, the driving circuit 130 and the resistor $R_a$ define a calibration loop L2 for calibrating or maintaining the regulated voltage $V_{REG}$ at a predetermined level as described herein below.

The second control circuit 160 is coupled to the second terminal of the resistor $R_a$ (i.e., to the regulated voltage terminal 170) and the feedback circuit 140. The second control circuit 160 is configured to control the feedback voltage $V_X$ based on the regulated voltage $V_{REG}$ at the second terminal of the resistor $R_a$. In some embodiments, the second control circuit 160 compares the regulated voltage $V_{REG}$ with a set voltage $V_{SET}$, and outputs a control signal S to the feedback circuit 140 to adjust the variable parameter of the feedback circuit 140. The set voltage $V_{SET}$ indicates the intended voltage level of the regulated voltage $V_{REG}$ to be supplied to the load. In at least one embodiment, the set voltage $V_{SET}$ is adjustable by a user and/or an external device. In some embodiments, when the regulated voltage $V_{REG}$ is lower than the set voltage $V_{SET}$ (for example, due to an increase in the load current $I_{LOAD}$ which causes an increased voltage drop across the resistor $R_a$), the second control circuit 160 outputs an appropriate control signal S to cause the feedback circuit 140 to decrease the feedback voltage $V_X$ which, in turn, causes the first control circuit 150 to increase the output voltage $V_{OUT}$ as described above. The increased output voltage $V_{OUT}$ compensates for the increased voltage drop across the resistor $R_a$ due to the increased load current $I_{LOAD}$, thereby maintain the regulated voltage $V_{REG}$ constant. When the regulated voltage $V_{REG}$ is higher than the set voltage $V_{SET}$ (for example, due to a decrease in the load current $I_{LOAD}$ which causes a decreased voltage drop across the resistor $R_a$), the second control circuit 160 outputs an appropriate control signal S to cause the feedback circuit 140 to increase the feedback voltage $V_X$ which, in turn, causes the first control circuit 150 to decrease the output voltage $V_{OUT}$ as described above. The decreased output voltage $V_{OUT}$ compensates for the decreased voltage drop across the resistor $R_a$ due to the decreased load current $I_{LOAD}$, thereby maintain the regulated voltage $V_{REG}$ constant. Other configurations and/or operations of the second control circuit are within the scope of various embodiments.

Without the adjustment of the feedback circuit 140 under control of the second control circuit 160, the first control circuit 150 would keep the output voltage $V_{OUT}$ constant, and the regulated voltage $V_{REG}$ would fluctuate due to variations in the load current $I_{LOAD}$. Thus, the second control circuit 160 in accordance with some embodiments operates to maintain the regulated voltage $V_{REG}$ constant in response to variations in the load current $I_{LOAD}$. Without the resistor $R_a$, the impedance at the output node 120 is defined by the capacitor $C_L$ which provides an impedance that approaches zero as the frequency increases. As a result, the gain (which reduces as the frequency increases) of the voltage regulator at high frequencies is limited under certain situations. By adding the resistor $R_a$ in accordance with some embodiments, the impedance at the output node 120 at high frequencies is defined by the impedance of the resistor $R_a$, thereby keeping the impedance at the output node 120 from falling below a certain level at high frequencies. As a result, the resistor $R_a$, in some embodiments, contributes to increase the gain of the voltage regulator at the Unity Gain Frequency (UGF). This effect permits the voltage regulator in accordance with some embodiments to achieve a PSRR of −40 dB or better (i.e., the absolute value of PSRR is at least 40 dB) across all frequencies, especially, around typical chip resonance frequencies of about a few MHz to 100 MHz. In some embodiments, the resistance value of the resistor $R_a$ is from 2Ω to 10Ω.

Figure 2:
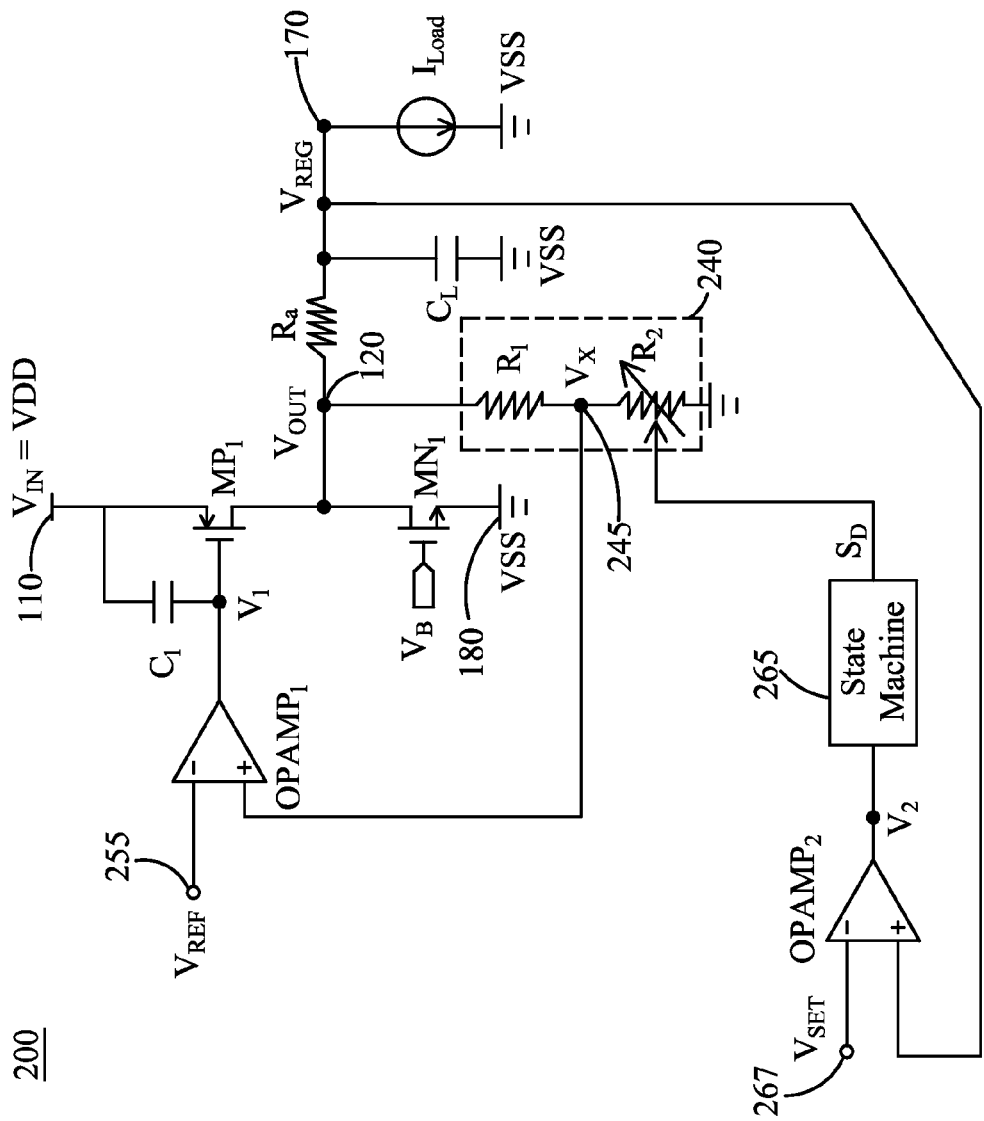

FIG. 2 is a schematic circuit diagram of a voltage regulator 200 in accordance with some embodiments. The voltage regulator 200 comprises a transistor $MP_1$ (also referred to herein as a driving transistor), a transistor $MN_1$, a voltage divider 240, a first operational amplifier $OPAMP_1$, a second operational amplifier $OPAMP_2$, a state machine 265, and the resistor Ra.

The transistor $MP_1$ and the transistor $MN_1$ together define a driving circuit similar to the driving circuit 130 described with respect to FIG. 1. The transistor $MP_1$ includes a first terminal (e.g., a source) coupled to the input node 110 to receive the power supply voltage VDD, a second terminal (e.g., a drain) coupled to the output node 120, and a gate terminal. A tracking capacitor $C_1$ is coupled between the input node 110 and the gate terminal of the transistor $MP_1$ to improve high frequency PSRR. In some embodiments, the capacitor $C_1$ is omitted. The transistor $MN_1$ includes a first terminal (e.g., a drain) coupled to the output node 120, a second terminal (e.g., a source) coupled to the voltage supply terminal 180 to receive the ground voltage VSS, and a gate terminal receiving a bias voltage $V_B$. The bias voltage $V_B$ configures the transistor $MN_1$ to be in the saturation mode. The configuration of the transistor $MN_1$ in the saturation mode achieves one or more effects as described in U.S. patent application Ser. No. 12/750,260. The transistor $MP_1$ is a PMOS transistor and the transistor $MN_1$ is an NMOS transistor in accordance with some embodiments. Other configurations are within the scope of various embodiments.

The voltage divider 240 includes a first resistor $R_1$ and a second resistor $R_2$. The first resistor $R_1$ is coupled between the output node 120 and an intermediate node 245. The second resistor $R_2$ is coupled between the intermediate node 245 and a node having the ground voltage VSS. At least one of the first resistor $R_1$ or the second resistor $R_2$ is a variable resistor. For example, in the embodiment illustrated in FIG. 2, the second resistor $R_2$ is a variable resistor. In one or more embodiments, the first resistor $R_1$ is a variable resistor or both the first resistor $R_1$ and the second resistor $R_2$ are variable resistors. The resistance values of the first resistor $R_1$ and the second resistor $R_2$ defines a voltage ratio of the voltage divider 240 and the feedback voltage $V_X$ generated at the intermediate node 245. As the second resistor $R_2$ is a variable resistor, the voltage ratio of the voltage divider 240 is also variable, and the feedback voltage $V_X$ generated at the intermediate node 245 is variable in accordance with resistance variations of the second resistor $R_2$.

The first operational amplifier $OPAMP_1$ defines a first control circuit similar to the first control circuit 150 described with respect to FIG. 1. The first operational amplifier $OPAMP_1$ includes a first input (e.g., an inverting input) coupled to a reference voltage node 255, a second input (e.g., a non-inverting input) coupled to the intermediate node 245 of the voltage divider 240, and an output coupled to the gate terminal of the driving transistor $MP_1$. The first operational amplifier $OPAMP_1$ compares the reference voltage $V_{REF}$ received at the inverting input via the reference voltage node 255 with the feedback voltage $V_X$ received at the non-inverting input from the voltage divider 240, and adjusts the voltage $V_1$ at the output thereof based on the comparison. The voltage $V_1$ is supplied to the gate terminal of the transistor $MP_1$ to control the current flowing through the transistor $MP_1$, thereby adjusting the output voltage $V_{OUT}$ as described with respect to FIG. 1.

Similar to the voltage regulator 100B, the resistor $R_a$ in the voltage regulator 200 has the first terminal coupled to the output node 120, and a second terminal coupled to the regulated voltage terminal 170 having the regulated voltage $V_{REG}$.

The second operational amplifier $OPAMP_2$ and the state machine 265 together define a second control circuit similar to the second control circuit 160 described with respect to FIG. 1. The second operational amplifier $OPAMP_2$ includes a first input (e.g., an inverting input) coupled to a set voltage node 267, a second input (e.g., a non-inverting input) coupled to the second terminal of the resistor $R_a$, and an output coupled to an input of the state machine 265. The state machine 265 further has an output coupled to the second resistor $R_2$ for controlling a resistance value of the second resistor $R_2$. The second operational amplifier $OPAMP_2$ compares the set voltage $V_{SET}$ received at the inverting input via the set voltage node 267 with the regulated voltage $V_{REG}$ received at the non-inverting input from the regulated voltage terminal 170, and adjusts a voltage $V_2$ at the output thereof based on the comparison. The voltage $V_2$ is supplied to the input of the state machine 265 which, in some embodiments, comprises a logic circuit configured to generate a digital control signal $S_D$ that reflects a voltage level of the voltage $V_2$. The digital control signal $S_D$ is outputted from the state machine 265 to the second resistor $R_2$ to vary the resistance value of the second resistor $R_2$ based on one or more bits in the digital control signal $S_D$.

The voltage regulator 200 operates in a manner similar to the voltage regulator 100B, and achieves one or more effects described with respect to the voltage regulator 100B. In a specific example, the voltage regulator 200 is configured to have the following nominal conditions: $I_{LOAD}$=20 mA, $R_a$=5Ω, $V_{SET}$=1.5 V, $V_{OUT}$=1.6 V, $V_{REG}$=1.5 V, $V_{REF}$=$V_X$=0.8 V, R1=2 KΩ, R2=2KΩ.

When the load current $I_{LOAD}$ is increased, e.g., from 20 mA to 30 mA, the voltage drop across the resistor $R_a$ becomes $I_{LOAD} \times R_a$=30 mA×5Ω=150 mV=0.15 V. At the nominal output voltage $V_{OUT}$ of 1.6 V, the regulated voltage $V_{REG}$ is decreased from 1.5 V to 1.6 V−0.15 V=1.45 V. The second operational amplifier OPAMP$_2$ detects that the decreased regulated voltage $V_{REG}$ (i.e., 1.45 V) is lower than the set voltage $V_{SET}$ (i.e., 1.5 V), and adjusts the voltage $V_2$ appropriately which, in turn, causes the state machine 265 to output a corresponding digital control signal $S_D$ that reduces the resistance value of the second resistor $R_2$. As a result, the voltage ratio $R_2/(R1+R_2)$ of the voltage divider 240 is decreased which decreases the feedback voltage $V_X$=$V_{OUT}$× $R_2/(R1-R_2)$. The first operational amplifier OPAMP$_1$ detects that the decreased feedback voltage $V_X$ is lower than the reference voltage $V_{REF}$, and adjusts the voltage $V_1$ appropriately to increases the output voltage $V_{OUT}$ (i.e., to increase the feedback voltage $V_X$). The second operational amplifier OPAMP$_2$ and the first operational amplifier OPAMP$_1$ automatically adjust the voltage ratio of the voltage divider 240 and the output voltage $V_{OUT}$, respectively, until $V_X$=$V_{REF}$=0.8 V at which the output voltage \T$_{OUT}$ becomes 1.65 V and the regulated voltage $V_{REG}$ returns to the nominal level (set by the set voltage $V_{SET}$) of 1.5 V.

When the load current $I_{LOAD}$ is decreased, e.g., from 20 mA to 10 mA, the voltage drop across the resistor $R_a$ becomes 0.05 V, and the regulated voltage $V_{REG}$ is increased to 1.55 V. The second operational amplifier OPAMP$_2$ detects that the increased regulated voltage $V_{REG}$ is higher than the set voltage $V_{SET}$, and adjusts the voltage $V_2$ appropriately which, in turn, causes the state machine 265 to output a corresponding digital control signal $S_D$ that increases the resistance value of the second resistor $R_2$. As a result, the voltage ratio $R_2/(R1+R_2)$ of the voltage divider 240 is increased which increases the feedback voltage $V_X$. The first operational amplifier OPAMP$_1$ detects that the increased feedback voltage $V_X$ is higher than the reference voltage $V_{REF}$, and adjusts the voltage $V_1$ appropriately to decreases the output voltage $V_{OUT}$ (i.e., to decrease the feedback voltage $V_X$). The second operational amplifier OPAMP$_2$ and the first operational amplifier OPAMP$_1$ automatically adjust the voltage ratio of the voltage divider 240 and the output voltage $V_{OUT}$, respectively, until $V_X$=V=0.8 V at which the output voltage $V_{OUT}$ becomes 1.55 V and the regulated voltage $V_{REG}$ returns to the nominal level of 1.5 V. Thus, despite an increase or a decrease in the load current $I_{LOAD}$, the regulated voltage $V_{REG}$ supplied to the load is kept constant. In the voltage regulator 200, the second operational amplifier OPAMP$_2$, the state machine 265, the feedback circuit 240, the first operational amplifier OPAMP$_1$, the driving circuit including the transistors MP$_1$ and MN$_1$, and the resistor Ra define a calibration loop (not shown in FIG. 2) for calibrating or maintaining the regulated voltage $V_{REG}$ at a predetermined level as described above.

Figure 3:
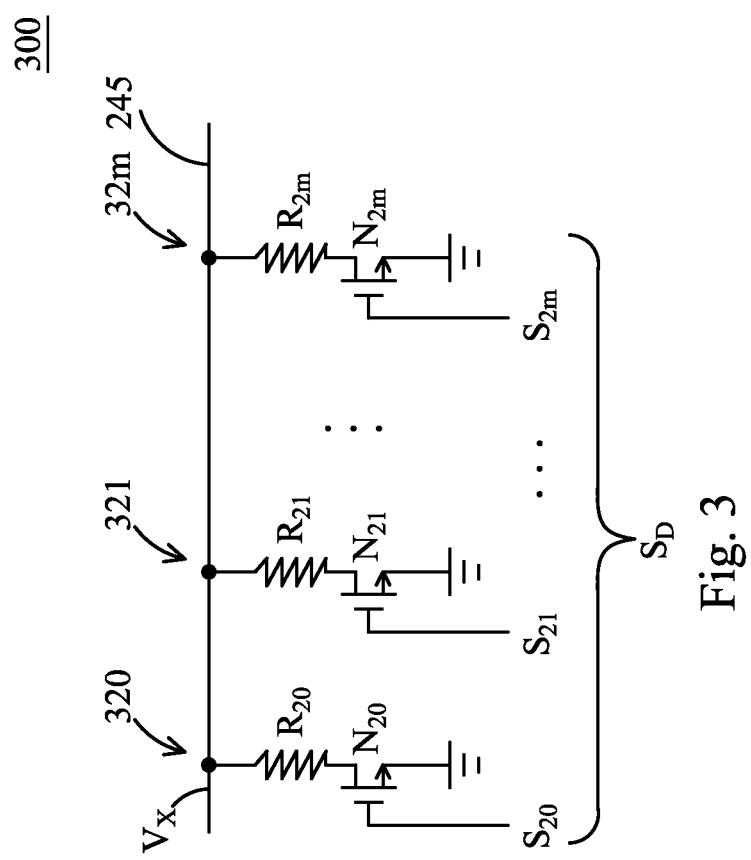
FIG. 3 is a schematic circuit diagram of a variable resistor in accordance with some embodiments.

FIG. 3 is a schematic circuit diagram of a variable resistor 300 in accordance with some embodiments. The variable resistor 300 is used in at least one embodiment as the second resistor $R_2$ in the voltage regulator 200. The variable resistor 300 includes a plurality of interconnected circuits 320, 321, . . . 32m, where m is a positive integer. Each of the circuit includes a resistor $R_{20}$, $R_{21}$, . . . or $R_{2m}$, coupled with a corresponding transistor $N_{20}$, $N_{21}$, . . . or $N_{2m}$. The gates of the transistors $N_{20}$, $N_{21}$, . . . $N_{2m}$ are coupled to receive corresponding gate control signals $S_{20}$, $S_{21}$, . . . $S_{2m}$ which together define the digital control signal $S_D$ supplied by the state machine 265. By applying an appropriate logic value "0" or "1" to the gate of each of the transistors $N_{20}$, $N_{21}$, . . . $N_{2m}$, the state machine 265 disables or enables the corresponding resistors $R_{20}$, $R_{21}$, . . . $R_{2m}$ to vary the resistance value of the variable resistor 300. In the specific configuration of the variable resistor 300 in FIG. 3, the circuits 320, 321, . . . 32m are coupled in parallel between the intermediate node 245 and the ground voltage VSS, and in each of the circuits 320, 321, . . . 32m, the resistor $R_{20}$, $R_{21}$, . . . or $R_{2m}$ is coupled in series with the corresponding transistor $N_{20}$, $N_{21}$, . . . or $N_{2m}$. However, other arrangements of serial and/or parallel interconnections among the circuits 320, 321, . . . 32m and/or between the resistor(s) and the corresponding transistor(s) in one or more circuits are within the scope of various embodiments. In one or more embodiments, the resistors $R_{20}$, $R_{21}$, . . . $R_{2m}$ are made of poly silicon (poly resistors) and the transistors $N_{20}$, $N_{21}$, . . . $N_{2m}$ are NMOS transistors. Other configurations for the resistors and/or the transistors are within the scope of various embodiments.

Figure 4:
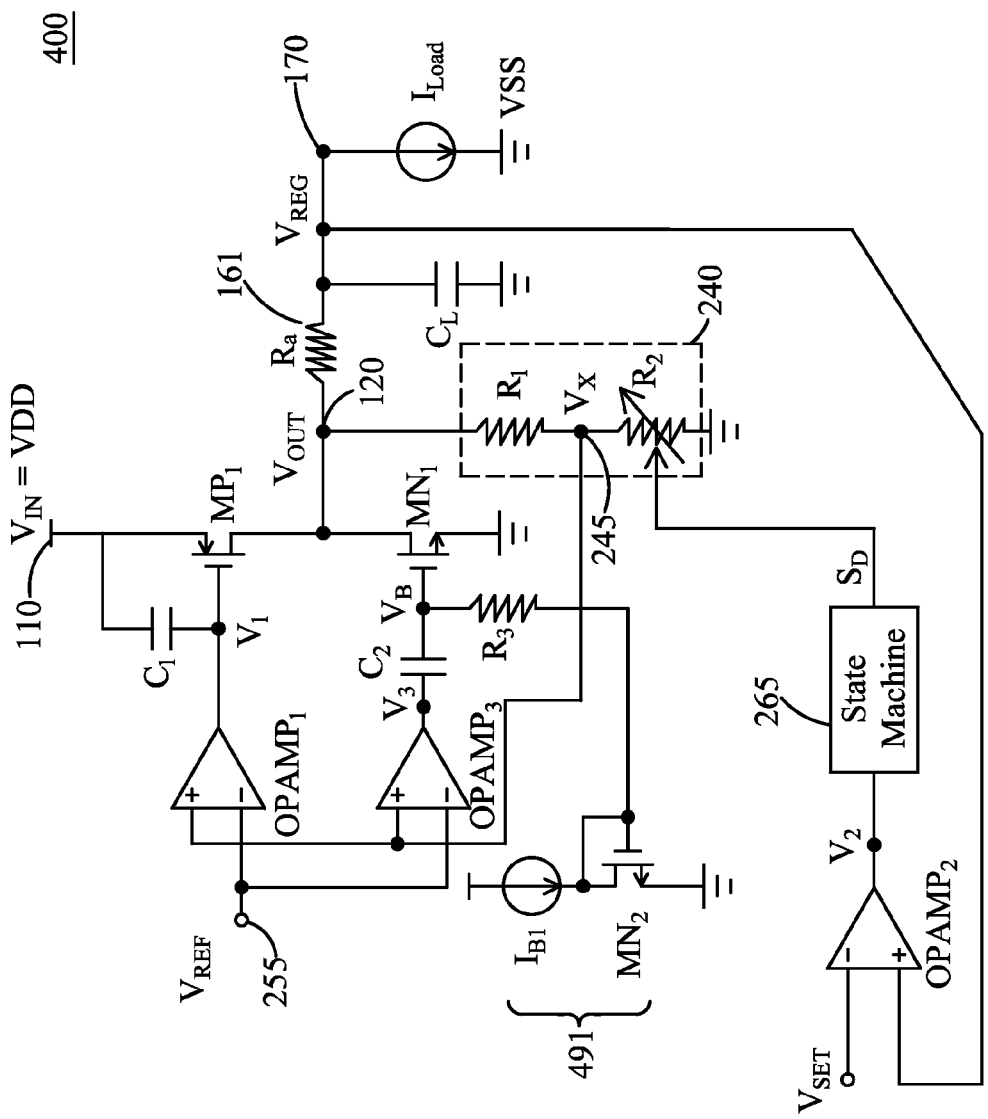
FIG. 4 is schematic circuit diagrams of a voltage regulator in accordance with some embodiments.

FIG. 4 is schematic circuit diagrams of a voltage regulator 400 in accordance with some embodiments. Compared to the voltage regulator 200, the voltage regulator 400 additionally includes a third operational amplifier OPAMP$_3$, an alternative current (AC) coupling capacitor C$_2$, a resistor R$_3$, and a bias voltage circuit 491. The third operational amplifier OPAMP$_3$ includes a first input (e.g., an inverting input) coupled to the reference voltage node 255, a second input (e.g., a non-inverting input) coupled to the intermediate node 245 of the voltage divider 240, and an output coupled to the gate terminal of the transistor MN$_1$ via the capacitor C$_2$. The bias voltage circuit 491 includes a current source $I_{B1}$ and an NMOS transistor MN$_2$. The bias voltage circuit 491 is coupled to the gate terminal of the transistor MN$_1$ via the resistor R$_3$. The bias voltage circuit 491 provides the bias voltage $V_B$ for configuring the transistor MN$_1$ in the saturation mode as described in U.S. patent application Ser. No. 12/750,260.

As also described in U.S. patent application Ser. No. 12/750,260, the third operational amplifier OPAMP$_3$ operates similarly to the first operational amplifier OPAMP$_1$ in various aspects, with a difference in that the first operational amplifier OPAMP$_1$ regulates the output voltage $V_{OUT}$ in response to low frequency (i.e., slow) changes in the output voltage $V_{OUT}$ and/or regulated voltage $V_{REG}$ whereas the third operational amplifier OPAMP$_3$ regulates the output voltage $V_{OUT}$ in response to high frequency (i.e., fast) changes in the output voltage $V_{OUT}$ and/or regulated voltage $V_{REG}$. Specifically, at low frequencies, the impedance of the capacitor C$_2$ is high and effectively disconnects the output of the third operational amplifier OPAMP$_3$ from the transistor MN$_1$. Therefore, the third operational amplifier OPAMP$_3$ does not significantly contribute to the regulation of the output voltage $V_{OUT}$ at low frequencies. At high frequencies, the impedance of the capacitor C$_2$ is lowered and a voltage $V_3$ at the output of the third operational amplifier OPAMP$_3$ is applied to the gate of the transistor MN$_1$ to regulate the current flowing through the transistor MN$_1$. therefore, the third operational amplifier OPAMP$_3$ regulates the output voltage $V_{OUT}$ together with the first operational amplifier OPAMP$_1$ at high frequencies. One or more effects described in U.S. patent application Ser. No. 12/750,260 is/are achievable in the voltage regulator 400.

Although the above description of FIG. 4 describes the third operational amplifier OPAMP$_3$ and first operational amplifier OPAMP$_1$ as two separate operational amplifiers, such a description is for illustrative purposes and/or simplicity. In one or more embodiments, the arrangement of the first operational amplifier OPAMP$_1$ and third operational amplifier OPAMP$_3$ includes a configuration in which the first operational amplifier OPAMP$_1$ and third operational amplifier OPAMP$_3$ are integrated in an operational amplifier having two outputs for the voltage V$_1$ and voltage V$_3$, respectively, as described in U.S. patent application Ser. No. 12/750,260.

In the voltage regulator 400, the second operational amplifier OPAMP$_2$, the state machine 265, the feedback circuit 240, the first control circuit including the first operational amplifier OPAMP$_1$ and third operational amplifier OPAMP$_3$, the driving circuit including the transistors MP$_1$ and MN$_1$, and the resistor Ra define a calibration loop (not shown in FIG. 4) for calibrating or maintaining the regulated voltage V$_{REG}$ at a predetermined level, as described above with respect to FIG. 2.

Figure 5:
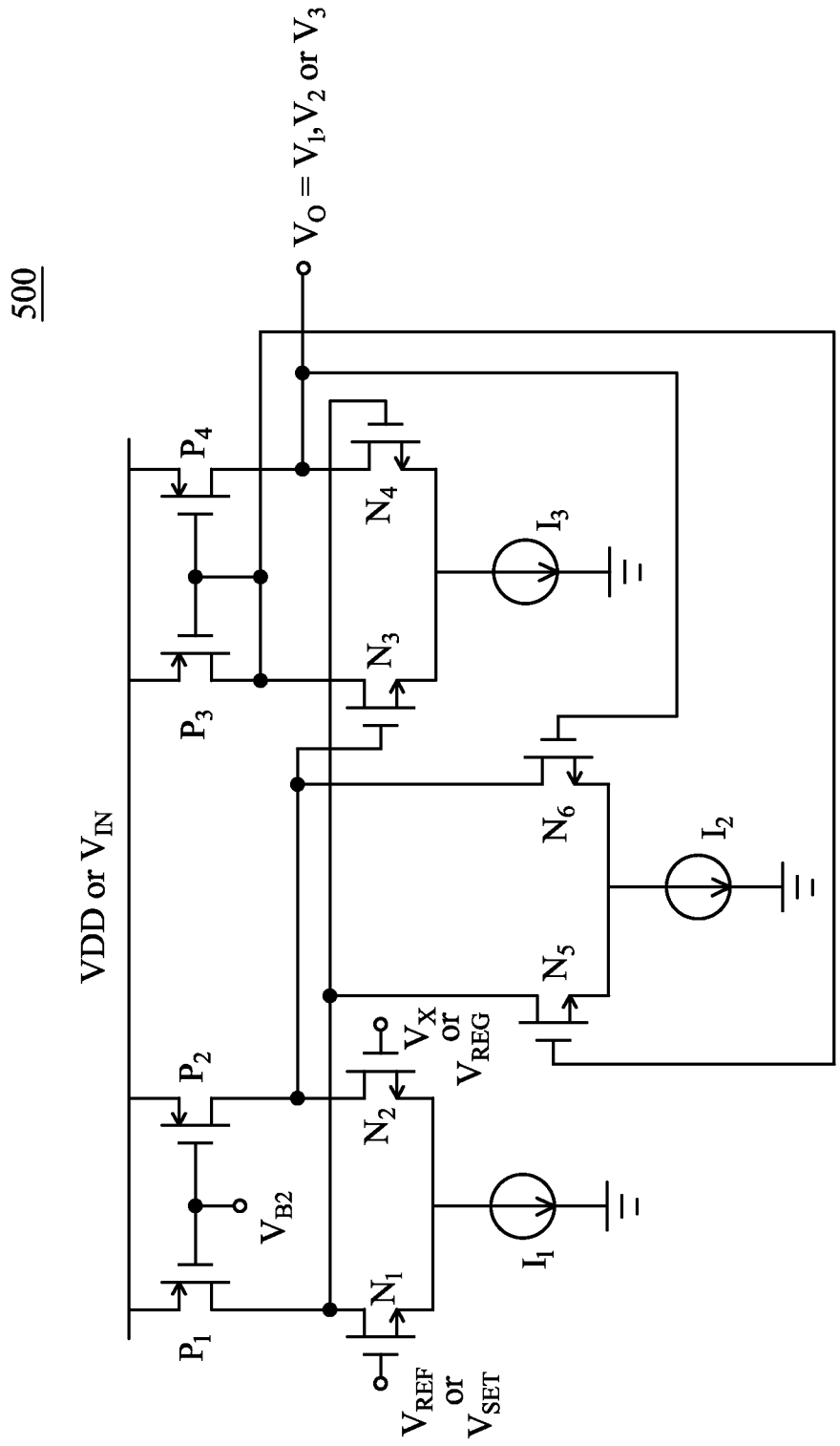
FIG. 5 is a schematic circuit diagram of a high bandwidth operational amplifier in accordance with some embodiments.

FIG. 5 is a schematic circuit diagram of a high bandwidth operational amplifier 500 in accordance with some embodiments. The operational amplifier 500 is used in at least one embodiment as any of the first operational amplifier OPAMP$_1$, second operational amplifier OPAMP$_2$ or third operational amplifier OPAMP$_3$. The operational amplifier 500 includes a plurality of PMOS transistors P$_1$-P$_4$, a plurality of NMOS transistors N$_1$-N$_6$, and a plurality of current sources I$_1$-I$_3$, which are coupled together in a configuration known in the art and operate in a manner known in the art. Other configurations for the first operational amplifier OPAMP$_1$, second operational amplifier OPAMP$_2$ and/or third operational amplifier OPAMP$_3$ are within the scope of various embodiments.

Figure 6:
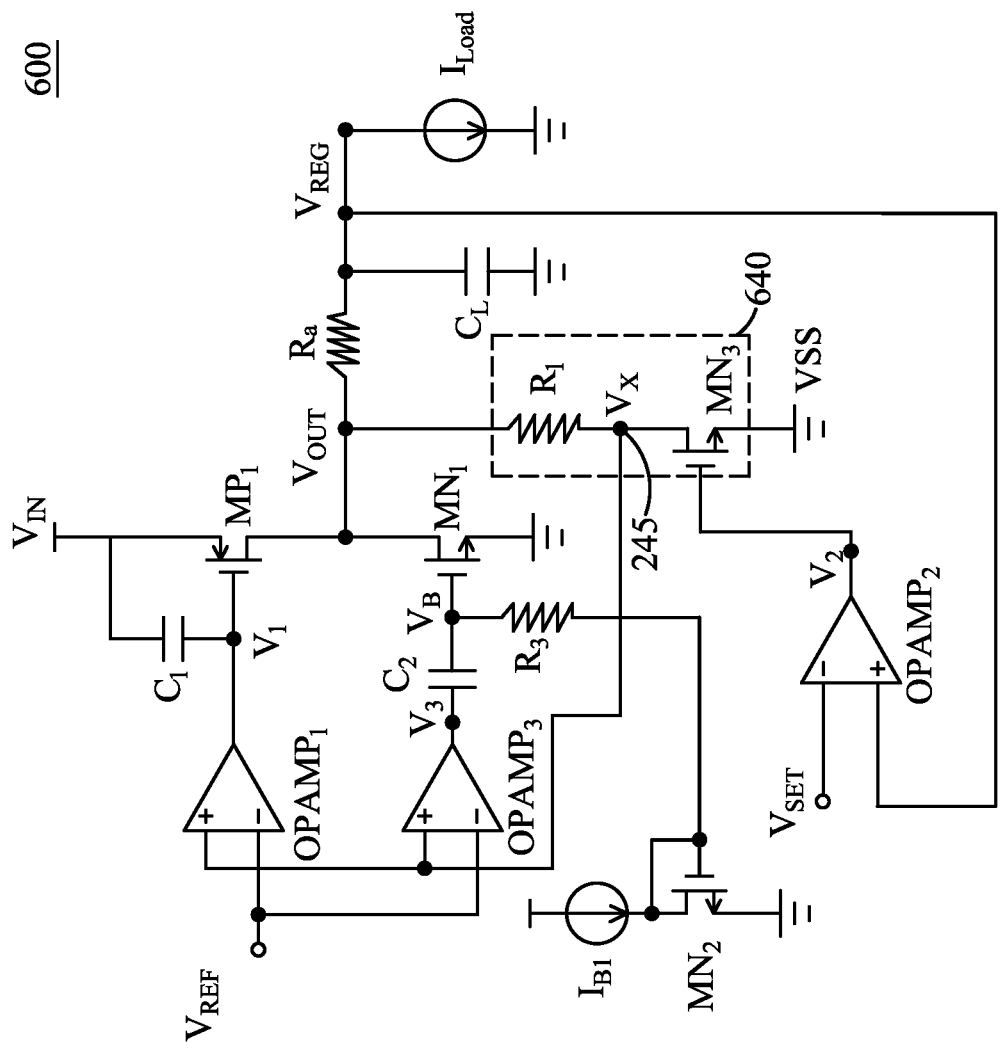
FIGS. 6-7 are schematic circuit diagrams of various voltage regulators in accordance with some embodiments.

FIG. 6 is a schematic circuit diagram of a voltage regulator 600 in accordance with some embodiments. Compared to the voltage regulator 400, the voltage regulator 600 includes an NMOS transistor MN$_3$ as a variable resistor which defines, together with the first resistor R$_1$, a voltage divider 640. The transistor MN$_3$ includes a first terminal (e.g., a drain) coupled to the intermediate node 245, a second terminal (e.g., a source) coupled to the ground voltage VSS, and a gate terminal coupled to the output of the second operational amplifier OPAMP$_2$. In one or more embodiments, the transistor MN$_3$ is a PMOS transistor. The voltage V$_2$ outputted from the second operational amplifier OPAMP$_2$ is an analog control signal having a variable voltage level depending on the comparison between the regulated voltage V$_{REG}$ and the set voltage V$_{SET}$. The resistance of the transistor MN$_3$ is adjustable in accordance with the analog control signal, i.e., the voltage V$_2$. As a result, the voltage ratio of the voltage divider and the feedback voltage V$_X$ at the intermediate node 245 are adjustable in accordance with the regulated voltage V$_{REG}$ by means of the analog control signal. In various other aspects, the voltage regulator 600 operates similarly to the voltage regulator 400. In the voltage regulator 600, the second operational amplifier OPAMP$_2$, the feedback circuit 640, the first control circuit including the first operational amplifier OPAMP$_1$ and third operational amplifier OPAMP$_3$, the driving circuit including the transistors MP$_1$ and MN$_1$, and the resistor Ra define a calibration loop (not shown in FIG. 6) for calibrating or maintaining the regulated voltage V$_{REG}$.

Figure 7:
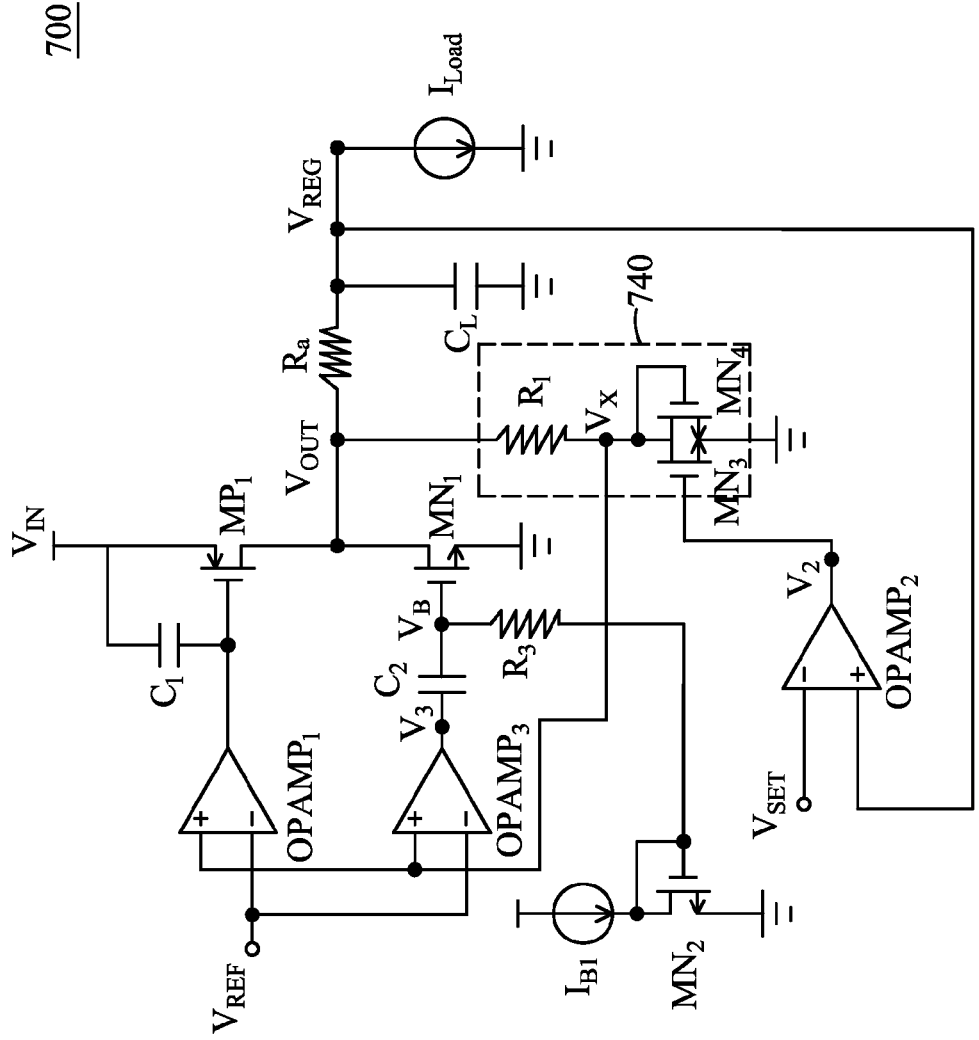

FIG. 7 is a schematic circuit diagram of a voltage regulator 700 in accordance with some embodiments. Compared to the voltage divider 640 in the voltage regulator 600, a voltage divider 740 in the voltage regulator 700 additionally includes an NMOS transistor MN$_4$ coupled in parallel with the transistor MN$_3$. Specifically, the transistor MN$_4$ includes a first terminal (e.g., a drain) coupled to the intermediate node 245, a second terminal (e.g., a source) coupled to the ground voltage VSS, and a gate terminal coupled to the drain of the transistor MN$_4$. In one or more embodiments, the transistor MN$_4$ is a PMOS transistor. Because the gate and drain of the transistor MN$_4$ are coupled to each other, the transistor MN$_4$ is a diode-connected transistor which functions as a diode. The diode-connected transistor MN$_4$ together with the transistor MN$_3$ provides a more linear behavior to the resistance variation of the transistor MN$_3$ than when the transistor MN$_4$ is not provided in parallel with the transistor MN$_3$. The more linear behavior in resistance variation of the transistor MN$_3$ makes it easier, in one or more embodiments, to design, control or calibrate the voltage regulator 700. In various other aspects, the voltage regulator 700 operates similarly to the voltage regulator 600. In the voltage regulator 700, the second operational amplifier OPAMP$_2$, the feedback circuit 740, the first control circuit including the first operational amplifier OPAMP$_1$ and third operational amplifier OPAMP$_3$, the driving circuit including the transistors MP$_1$ and MN$_1$, and the resistor Ra define a calibration loop (not shown in FIG. 7) for calibrating or maintaining the regulated voltage V$_{REG}$.

Figure 8:
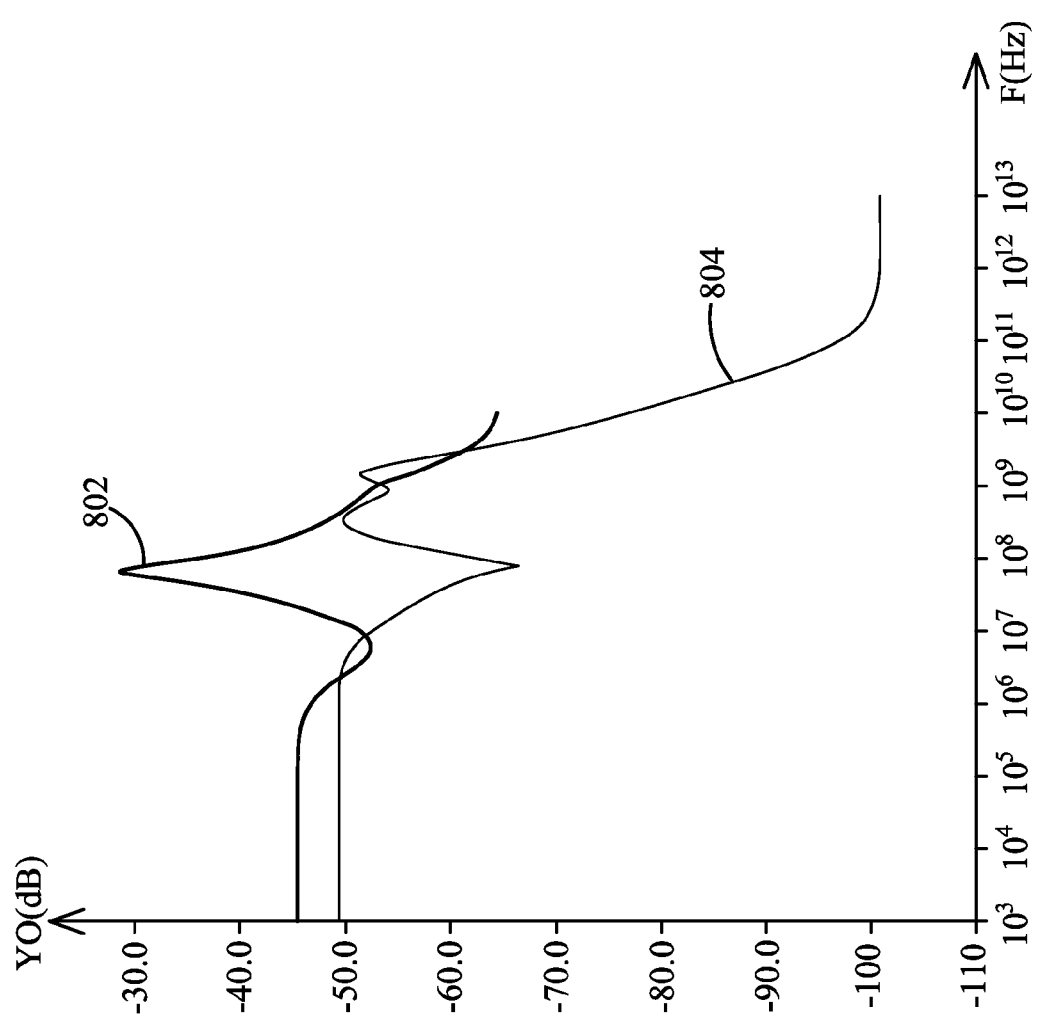
FIG. 8 is a graph showing PSRR versus frequency characteristics of various voltage regulators.

FIG. 8 is a graph showing PSRR versus frequency characteristics of various voltage regulators. The horizontal axis or X axis in FIG. 8 indicates the voltage supply (VDD) noise frequency range of the voltage regulators, and the vertical axis or Y axis in FIG. 8 indicates the PSRRs of the voltage regulators as measured in −dB. Higher absolute values of PSRR indicate higher levels of power supply noise immunity. A characteristic 802 indicates a PSRR versus frequency characteristic of a voltage regulator that does not includes an output stage resistor or a control circuit for adjusting a variable feedback circuit. A characteristic 804 indicates a PSRR versus frequency characteristic of a voltage regulator in which an output stage resistor and a control circuit for adjusting a variable feedback circuit are provided in accordance with some embodiments. The characteristic 802 indicates fairly good PSRR values of −30 dB or better (i.e., the absolute value of PSRR is at least 30 dB) over a relatively wide range of frequency. However, the characteristic 804 of the voltage regulator in accordance with some embodiments indicates even better PSRR values. Specifically, the PSRR of the voltage regulator in accordance with some embodiments is −40 dB or better (i.e., the absolute value of PSRR is at least 40 dB) across a wide range of frequency, e.g., from $10^3$ Hz to $10^{13}$ Hz. Thus, the PSRR of voltage regulators in accordance with some embodiments is favorable for use in many applications, such as Phase Locked Loop (PLL), Delay Locked Loop (DLL), embedded Dynamic Random Access Memory (eDRAM), etc., where power supply noise immunity is a significant consideration. As described herein and/or in U.S. patent application Ser. No. 12/750,260, voltage regulators in accordance with some embodiments further include one or more effects, such as automatic self-calibration in response to load current variations, increased gain at UGF, increased unity gain bandwidth (UGBW), over-voltage and/or low-load instability prevention, etc.

Figure 9:
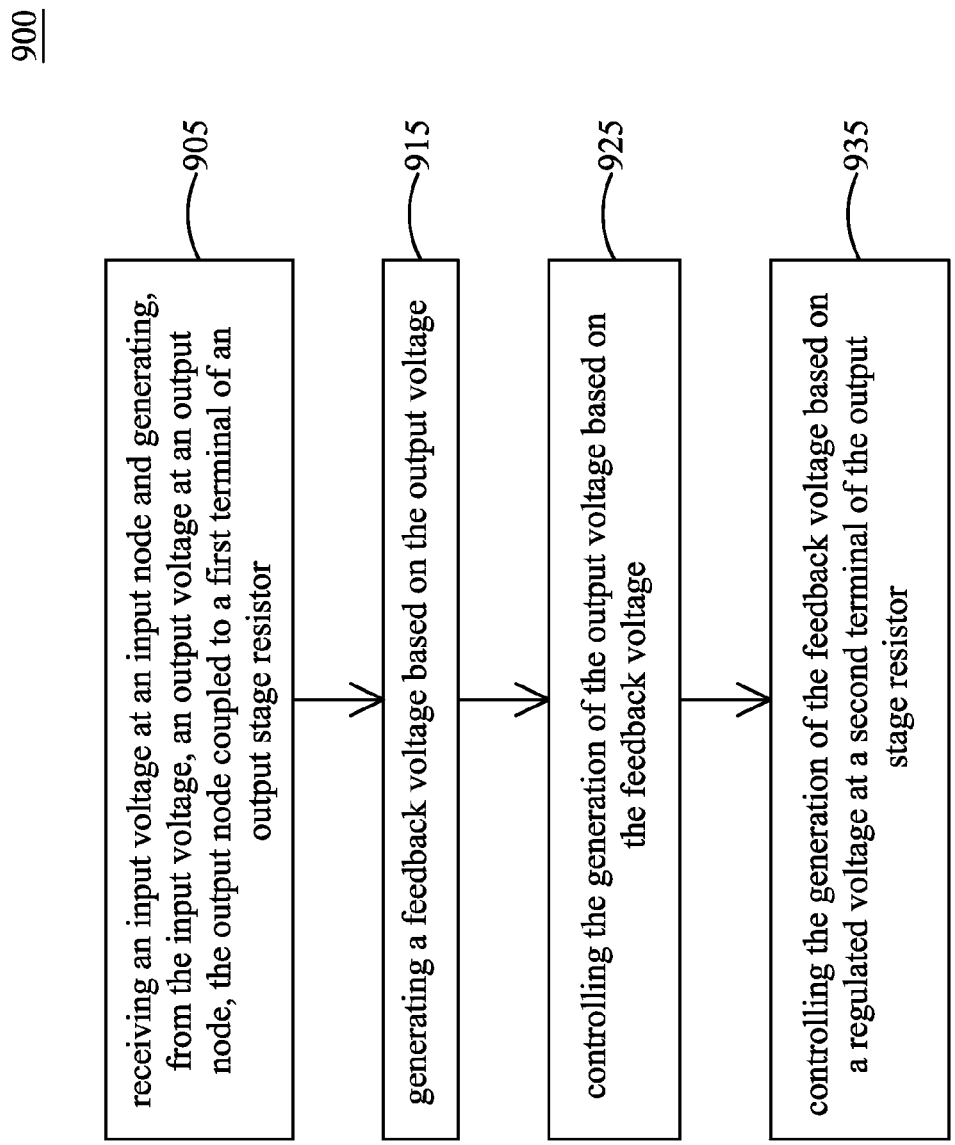
FIG. 9 is a flow chart of a process of operating a voltage regulator in accordance with some embodiments.

FIG. 9 is a flow chart of a process 900 of operating a voltage regulator in accordance with some embodiments. In one or more embodiments, the voltage regulator operated in the process 900 includes one or more of the voltage regulators disclosed with respect to FIGS. 1A-1B, 2, 4, 6 and 7. In the following description, the process 900 operates the voltage regulator 100B disclosed with respect to FIG. 1B, for example.

At operation 905, an input voltage is received at an input node of the voltage regulator, and an output voltage is generated at an output node of the voltage regulator from the input voltage. The output node is coupled to a first terminal of an output stage resistor. For example, as disclosed with respect to FIG. 1B, an input voltage $V_{IN}$ is received at an input node 110 of the voltage regulator 100B. An output voltage $V_{OUT}$ is generated, by the driving circuit 130 and from the input voltage $V_{IN}$, at an output node 120 of the voltage regulator 100B. The output node 120 is coupled to a first terminal of an output stage resistor 161.

At operation 915, a feedback voltage is generated based on the output voltage. For example, as disclosed with respect to FIG. 1B, a feedback voltage $V_X$ is generated, by the feedback circuit 140, based on the output voltage $V_{OUT}$.

At operation 925, the generation of the output voltage is controlled based on the feedback voltage. For example, as disclosed with respect to FIG. 1B, the generation of the output voltage $V_{OUT}$ is controlled, by the first control circuit 150, based on the feedback voltage $V_X$. More particularly, if the output voltage $V_{OUT}$ decreases, the feedback voltage $V_X$ also decreases and causes the first control circuit 150 to output an appropriate voltage $V_1$ to increase the current $I_D$ of the driving circuit 130, thereby increasing the output voltage $V_{OUT}$. If the output voltage $V_{OUT}$ increases, the feedback voltage $V_X$ also increases and causes the first control circuit 150 to output an appropriate voltage $V_1$ to decrease the current $I_D$ of the driving circuit 130, thereby decreasing the output voltage $V_{OUT}$.

At operation 935, the generation of the feedback voltage is controlled based on a regulated voltage at a second terminal of the output stage resistor. For example, as disclosed with respect to FIG. 1B, the generation of the feedback voltage $V_X$ is controlled, by the second control circuit 160, based on a regulated voltage $V_{REG}$ at a second terminal of the output stage resistor 161. More particularly, if the regulated voltage $V_{REG}$ decreases, the second control circuit 160 outputs a control signal S to the feedback circuit 140 to decrease the feedback voltage $V_X$. The decreased feedback voltage $V_X$ causes the first control circuit 150 to increase the output voltage $V_{OUT}$ which, in turn, increases the regulated voltage $V_{REG}$. If the regulated voltage $V_{REG}$ increases, the second control circuit 160 outputs a control signal S to the feedback circuit 140 to increase the feedback voltage $V_X$. The increased feedback voltage $V_X$ causes the first control circuit 150 to decrease the output voltage $V_{OUT}$ which, in turn, decreases the regulated voltage $V_{REG}$. As a result, the regulated voltage $V_{REG}$ to be supplied to a load is maintained in accordance with some embodiments at a predetermined level.

In some embodiments, the control of the feedback voltage $V_X$ based on the regulated voltage $V_{REG}$ includes an automatic control by a control circuit as disclosed with respect to FIG. 1B, 2, 4, 6 and 7.

In some embodiments, the control of the feedback voltage $V_X$ based on the regulated voltage $V_{REG}$ includes a manual control. In one or more embodiments, the regulated voltage $V_{REG}$ is measured and outputted, e.g., via a display, to an operator of the voltage regulator. The operator manually adjusts the feedback voltage $V_X$ based on the measured regulated voltage $V_{REG}$ to bring the regulated voltage $V_{REG}$ to the predetermined level, as described immediately above.

For example, in embodiments where the feedback circuit includes a variable resistor as disclosed with respect to FIG. 3 or FIG. 6, the operator manually adjusts the corresponding control signal $S_D$ (FIG. 3) or voltage $V_2$ (FIG. 6) to whereby adjust the feedback voltage $V_X$.

The above method embodiment shows example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to some embodiments, a voltage regulator comprises: an input node, an output node, a driving circuit, a feedback circuit, a first control circuit, a second control circuit, and an output stage resistor. The driving circuit is coupled to the input node and the output node, and is configured to generate an output voltage at the output node from an input voltage at the input node. The feedback circuit is coupled to the output node and is configured to generate a feedback voltage based on the output voltage. The first control circuit is coupled to the feedback circuit and the driving circuit, and is configured to control the output voltage based on the feedback voltage. The output stage resistor has opposite first and second terminals. The first terminal of the output stage resistor is coupled to the output node. The second control circuit is coupled to the second terminal of the output stage resistor and the feedback circuit, and is configured to control the feedback voltage based on a regulated voltage at the second terminal of the output stage resistor.

According to some embodiments, a voltage regulator comprises: an input node, an output node, a driving transistor, a voltage divider, a first operational amplifier, a second operational amplifier, and an output stage resistor. The driving transistor includes a first terminal coupled to the input node, a second terminal coupled to the output node, and a gate terminal. The voltage divider includes a first resistor coupled between the output node and an intermediate node, and a second resistor coupled between the intermediate node and a voltage supply terminal. At least one of the first resistor or the second resistor is a variable resistor. The first operational amplifier includes a first input coupled to a reference voltage node, a second input coupled to the intermediate node of the voltage divider, and an output coupled to the gate terminal of the driving transistor. The output stage resistor has opposite first and second terminals. The first terminal of the output stage resistor is coupled to the output node. The second operational amplifier includes a first input coupled to a set voltage node, a second input coupled to the second terminal of the output stage resistor, and an output coupled to the variable resistor of the voltage divider for controlling a resistance value of the variable resistor.

According to some embodiments, a process of operating a voltage regulator comprises receiving an input voltage at an input node of the voltage regulator, and generating, from the input voltage, an output voltage at an output node of the voltage regulator. The output node is coupled to a first terminal of an output stage resistor. The process further comprises generating a feedback voltage based on the output voltage, controlling the generation of the output voltage based on the feedback voltage, and controlling the generation of the feedback voltage based on a regulated voltage at a second terminal of the output stage resistor.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A voltage regulator, comprising:
an input node;
an output node;
a driving circuit coupled to the input node and the output node, the driving circuit configured to generate an output voltage at the output node from an input voltage at the input node;
a feedback circuit coupled to the output node, the feedback circuit configured to generate a feedback voltage based on the output voltage;
a first control circuit coupled to the feedback circuit and the driving circuit, the first control circuit configured to control the output voltage based on the feedback voltage;
an output stage resistor having opposite first and second terminals, the first terminal of the output stage resistor coupled to the output node; and
a second control circuit coupled to the second terminal of the output stage resistor and the feedback circuit, the second control circuit configured to control the feedback voltage based on a regulated voltage at the second terminal of the output stage resistor.

2. The voltage regulator of claim 1, wherein the first control circuit and the second control circuit are configured to maintain the regulated voltage constant in response to variations in a load current flowing through the output stage resistor.

3. The voltage regulator of claim 1, wherein
the feedback circuit comprises a voltage divider having a variable voltage ratio that defines the feedback voltage; and
the second control circuit is configured to vary the voltage ratio of the voltage divider based on the regulated voltage.

4. The voltage regulator of claim 3, wherein
the voltage divider comprises:
a first resistor coupled between the output node and an intermediate node, the intermediate node coupled to the first control circuit; and
a second resistor coupled between the intermediate node and a voltage supply terminal; and
at least one of the first resistor or the second resistor is a variable resistor having a resistance value that is variable under control of the second control circuit.

5. The voltage regulator of claim 4, wherein
the variable resistor comprises a plurality of interconnected circuits each comprising a resistor and a transistor coupled to each other; and
the second control circuit is coupled to gates of the transistors and configured to supply a digital control signal to the gates of the transistors to selectively turn ON or OFF the transistors based on the regulated voltage.

6. The voltage regulator of claim 4, wherein
the variable resistor comprises a transistor; and
the second control circuit is coupled to a gate of the transistor and configured to supply an analog control signal to the gate of the transistor to vary a resistance of the transistor based on the regulated voltage.

7. The voltage regulator of claim 6, further comprising:
a diode-connected transistor coupled in parallel with the transistor of the variable resistor.

8. The voltage regulator of claim 1, further comprising:
a transistor coupled between the output node and a voltage supply terminal; and
a third control circuit coupled to the feedback circuit and a gate terminal of the transistor, the third control circuit configured to control the output voltage based on the feedback voltage by adjusting a current flowing through the transistor between the output node and the voltage supply terminal.

9. The voltage regulator of claim 8, further comprising:
a bias voltage circuit coupled to the gate terminal of the transistor and configured to supply a bias voltage to the gate terminal of the transistor to configure the transistor in a saturation mode.

10. The voltage regulator of claim 1, wherein a resistance value of the output stage resistor is from $2\Omega$ to $10\Omega$.

11. A voltage regulator, comprising:
an input node;
an output node;
a driving transistor including
a first terminal coupled to the input node,
a second terminal coupled to the output node, and
a gate terminal;
a voltage divider including
a first resistor coupled between the output node and an intermediate node, and
a second resistor coupled between the intermediate node and a voltage supply terminal, wherein at least one of the first resistor or the second resistor is a variable resistor;
a first operational amplifier including
a first input coupled to a reference voltage node,
a second input coupled to the intermediate node of the voltage divider, and
an output coupled to the gate terminal of the driving transistor;
an output stage resistor having opposite first and second terminals, the first terminal of the output stage resistor coupled to the output node; and
a second operational amplifier including
a first input coupled to a set voltage node,
a second input coupled to the second terminal of the output stage resistor, and
an output coupled to the variable resistor of the voltage divider for controlling a resistance value of the variable resistor.

12. The voltage regulator of claim 11, further comprising:
a state machine coupled between the output of the second operational amplifier and the variable resistor of the voltage divider, the state machine configured to convert a voltage at the output of the second operational amplifier to a digital control signal for controlling the resistance value of the variable resistor.

13. The voltage regulator of claim 12, wherein
the variable resistor comprises a plurality of interconnected circuits each comprising a resistor and a transistor coupled to each other; and
an output of the state machine is coupled to gates of the transistors in the variable resistor to supply the digital control signal to the gates of the transistors to selectively turn ON or OFF the transistors.

14. The voltage regulator of claim 11, wherein
the variable resistor comprises a transistor; and
the output of the second operational amplifier is coupled to a gate of the transistor to supply an analog control signal to the gate of the transistor to vary a resistance of the transistor.

15. The voltage regulator of claim 14, further comprising:
a diode-connected transistor coupled in parallel with the transistor of the variable resistor.

16. The voltage regulator of claim 11, further comprising:
a further transistor coupled between the output node and a voltage supply terminal, the further transistor configured to operate in a saturation mode;
a capacitor coupled to a gate terminal of the further transistor; and
a third operational amplifier including
 a first input coupled to the reference voltage node,
 a second input coupled to the intermediate node of the voltage divider, and
 an output coupled to the gate terminal of the driving transistor via the capacitor.

17. The voltage regulator of claim 16, wherein
the driving transistor is a p-channel metal-oxide semiconductor (PMOS) transistor,
the first input of the first operational amplifier is an inverting input, and the second input of the first operational amplifier is a non-inverting input,
the first input of the second operational amplifier is an inverting input, and the second input of the second operational amplifier is a non-inverting input,
the further transistor is an n-channel metal-oxide semiconductor (NMOS) transistor, and
the first input of the third operational amplifier is an inverting input, and the second input of the third operational amplifier is a non-inverting input.

18. A process of operating a voltage regulator, the process comprising:
receiving an input voltage at an input node of the voltage regulator;
generating, from the input voltage, an output voltage at an output node of the voltage regulator, the output node coupled to a first terminal of an output stage resistor;
generating a feedback voltage based on the output voltage;
controlling the generation of the output voltage based on the feedback voltage; and
controlling the generation of the feedback voltage based on a regulated voltage at a second terminal of the output stage resistor.

19. The process of claim 18, wherein controlling the generation of the feedback voltage comprises a manual control.

20. The process of claim 18, wherein controlling the generation of the feedback voltage comprises an automatic control.

* * * * *